(12) United States Patent
Shapovalov (10) Patent No.: US 7,684,076 B2
(45) Date of Patent: Mar. 23, 2010

(54) METHOD AND APPARATUS FOR RASTER IMAGE PROCESSING

(75) Inventor: Georgiy Volodymirovich Shapovalov, Eastlakes (AU)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 1328 days.

(21) Appl. No.: 10/898,046

(22) Filed: Jul. 23, 2004

(65) Prior Publication Data

US 2006/0017974 A1      Jan. 26, 2006

(51) Int. Cl.
*G06K 15/00* (2006.01)
*G06F 3/12* (2006.01)

(52) U.S. Cl. .................. 358/1.17; 358/1.1; 358/1.16

(58) Field of Classification Search .............. 358/1.1, 358/1.9, 1.11, 1.12, 1.13, 1.14, 1.15, 1.16, 358/1.17, 1.18, 3.01, 3.27, 452, 453, 537, 358/538, 539
See application file for complete search history.

(56) References Cited

U.S. PATENT DOCUMENTS

| | | | |
|---|---|---|---|
| 5,159,681 A | 10/1992 | Beck et al. | |
| 5,708,763 A | 1/1998 | Peltzer | |
| 5,717,842 A | 2/1998 | Ambalavanar et al. | |
| 5,870,535 A | 2/1999 | Duffin et al. | |
| 5,923,820 A | 7/1999 | Cunnagin et al. | |
| 5,930,466 A | 7/1999 | Rademacher | |
| 6,049,390 A | 4/2000 | Notredame et al. | |
| 6,092,171 A * | 7/2000 | Relph | 711/203 |
| 6,181,835 B1 | 1/2001 | Hamill | |
| 6,195,473 B1 | 2/2001 | Zable et al. | |
| 6,269,190 B1 | 7/2001 | Mikkelsen et al. | |
| 6,295,133 B1 | 9/2001 | Bloomquist et al. | |
| 6,313,847 B1 | 11/2001 | Carlsen | |
| 6,429,949 B1 | 8/2002 | Dziesietnik et al. | |
| 6,462,833 B1 | 10/2002 | Claiborne | |
| 6,463,177 B1 | 10/2002 | Li et al. | |
| 6,466,210 B1 | 10/2002 | Carlsen et al. | |
| 6,476,931 B1 * | 11/2002 | Aizikowitz et al. | 358/1.18 |
| 6,559,958 B2 | 5/2003 | Motamed et al. | |
| 6,574,008 B1 | 6/2003 | Yokose et al. | |
| 6,651,116 B1 | 11/2003 | Ludwig et al. | |
| 7,161,603 B2 * | 1/2007 | Saito et al. | 345/614 |
| 2002/0196467 A1 | 12/2002 | Delhoune et al. | |
| 2004/0091163 A1 | 5/2004 | Anderson et al. | |

* cited by examiner

*Primary Examiner*—Thierry L Pham
(74) *Attorney, Agent, or Firm*—Tucker Ellis & West LLP (57) ABSTRACT

This invention is directed to a method and apparatus for raster image processing which allows access to the page buffer during raster image processing. The method and apparatus of the present invention allow for virtually every page presented to the raster image processor to be printed with available memory. In addition, the method and apparatus for raster image processing of the present invention significantly reduces the bandwidth required between the raster image processor and the raster image processor manager. In addition, the method and apparatus for raster image processing of the present invention has equal or better performance than those methods or apparatuses that use display lists. Further, the method and apparatus of the present invention support the use of tag data and multiple page description languages.

28 Claims, 7 Drawing Sheets

*Figure 1*

| Page Buffer Manager Pixel ||
|---|---|
| 202 — Flags - | Set of bit-flags to qualify the presence of bit-fields sets |
| 204 — Bit Field Array - | Bit-field set of data, accomodates bits data for upto 6 bits field sets |

*Figure 2*

| Page Buffer Manager Pixel || |
|---|---|---|
| 302 — Flags -  304 || Set of bit-flags to qualify the presence of bit-fields below |
| Bit Field Array - 306 | First | not present |
| | Second | present |
| 316 — 308 | Third | present |
| 310 | Fourth | not present |
| 312 | Fifth | not present |
| 314 | Sixth | not present |

*Figure 3*

| Page Buffer Manager Chunk ||
|---|---|
| 402 — Flags - | Set of bit-flags to qualify the colorant fields below |
| 404 — Next | Pointer to next (existing) chunk structure (within linked list) |
| 406 — First bit fields set | values for 64 bit fields of the first data set (8-256 bytes) as set by manager configuration |
| 408 — Second bit fields set | second (existing) bitfields data set (8-256 bytes) |
| 410 — Third bit fields set | third (existing) bitfields data set (8-256 bytes) |
| 412 — Fourth bit fields set | fourth (existing) bitfields data set (8-256 bytes) |
| 414 — Fifth bit fields set | fifth (existing) bitfields data set (8-256 bytes) |
| 416 — Sixth bit fields set | sixth (existing) bitfields data set (8-256 bytes) |

METHOD AND APPARATUS FOR RASTER IMAGE PROCESSING

BACKGROUND OF THE INVENTION

This invention is directed to a method and apparatus for raster image processing. More particularly, this invention is directed to a method and apparatus for raster image processing which uses page buffer management.

Typically, a raster image is used to output image data to an output device, such as a cathode ray tube monitor, an LCD, or a document output device, such as a printer. A raster image is represented as a series of scan lines of pixels, wherein each pixel is accessed in a sequential manner and each scan line is processed. An area to which image data may be output sequentially by an output device is referred to as a page.

In the past, there were sufficient memory resources in a typical output device or system to fully represent a single page in memory as a bitmap. A 600 by 600 dots per inch monochrome image would require approximately 4 megabytes of memory for an A4 page and approximately 8 megabytes of memory for an A3 page. However, as more users require color images, it is unlikely that current output devices or systems have adequate memory resources available to store a single page in memory. For example, a 600 by 600 dots per inch color image with 4 color planes that are each 8 bits deep, would require approximately 256 megabytes for an A3 page. If the resolution is increased to 1200 by 1200 dots per inch, the memory requirement is approximately 1 gigabyte. If the image data includes tag-bit data, the memory requirement for a single page is in excess of 300 megabytes for an A3 page.

Traditionally, raster image processes have been used to avoid such memory constraints by implementing display lists. Display lists allow raster image processing to operate in more constrained memory configurations and are more capable of handling memory constraints. Display lists also provide a generic representation of page data which is beneficial in supporting multiple page description languages, as well as a number of post raster image processing operations.

However, there are several problems with using display lists to avoid memory constraints. For example, even using display lists, there are some pages that cannot be accommodated or processed in some memory configurations. In addition, some raster image processing methods will not process image data having such large memory requirements. Further, using display lists requires a two pass raster image processing operation which requires additional overhead for display list maintenance and in processing time.

The subject invention overcomes the above-noted limitations and provides a method and apparatus for raster image processing which uses page buffer management.

SUMMARY OF INVENTION

In accordance with the present invention, there is provided a method and apparatus for raster image processing which uses page buffer management.

Further, in accordance with the present invention, there is provided a method and apparatus for raster image processing which allows access to the page buffer during raster image processing. The method and apparatus of the present invention allow for virtually every page presented to the raster image processor to be printed with available memory. In addition, the method and apparatus for raster image processing of the present invention significantly reduces the bandwidth required between the raster image processor and the raster image processor manager. In addition, the method and apparatus for raster image processing of the present invention has equal or better performance than those methods or apparatuses that use display lists. Further, the method and apparatus of the present invention support the use of tag data and multiple page description languages.

Still further, in accordance with the present invention, there is provided a raster image processor that enables access to the page buffer during raster image processing. The processor includes means adapted for receiving image data that has a linear bit stream representing an associated image. Segmenting means are included that segment the image data into M chunks with each chunk consisting of N bits. M and N are integers greater than one. The processor also includes an addressable page map memory to store page map data. The page map data includes at least M entries. Each entry in the list corresponds to a single chunk. Each entry then stores a first flag value representing a selected value of a corresponding chunk and a second flag value when the corresponding chunk has a value other than the first selected value.

In a preferred embodiment, the raster image processor further includes memory allocation means, which is adapted to allocate at least N bits of data storage in an associated page memory for each entry in the page map memory having the first flag value. The memory allocation means is adapted to allocate no data storage bits for each entry in the page map memory being other than the first selected value.

In a preferred embodiment, the raster image processor includes addressing means adapted for addressing the page memory. The addressing means includes means adapted for receiving address information solely to an entry corresponding to a first associated chunk (M=1). Each successive entry associated with the first chunk includes pointer data representing an entry corresponding to a next chunk (M=2, 3, . . . ), such that the entries form a linked list. A plurality of such linked lists, each containing a plurality of chunks, can be used for accessing the page map memory. The raster image processor also includes means adapted for receiving, into the associated page memory, each chunk of the image data corresponding to the first flag value. The raster image processor also includes compression means adapted for selectively compressing at least one chunk of image data based on predetermined criteria.

Still yet further, in accordance with the present invention, there is provided a raster image processing method. The method includes the step of receiving image data that comprises a linear bit stream representing an associated image. The image data is then segmented into M chunks, with each chunk having N number of bits. Page map data is then stored, including a list of at least M entries. Each entry in the list corresponds to a single chunk and is capable of storing a first flag value and at least a second flag value. The first flag value represents a first selected value of a corresponding chunk. The second flag value is included when the corresponding chunk has a value other than the first selected value.

In a preferred embodiment, the raster image processing method includes the step of allocating at least N bits of data storage in an associated page memory for each entry in the page map memory having the first flag value. No data storage bits are allocated for each entry in the page map memory being other than the first selected value. The page map memory is then addressed, such that address information is received solely to an entry corresponding to a first associated chunk (M=1). Each successive entry associated with the first chunk includes pointer data representing an entry corresponding to a next chunk (M=2, 3, . . . ), such that the entries form a linked list. Thus, the linked list is suitably a serially addressable list, and such exists in tip-to-tail data storage schemes.

In a preferred embodiment, the method further comprises the step of selectively initiating communication of the image data to a selected document output device from the associated page memory. The selected output device includes a facsimile, a printing device, a scanning device, a copying device and a multifunction peripheral device. The raster image processing method also includes the step of selectively compressing at least one chunk of image data based on predetermined criteria.

Still other aspects of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
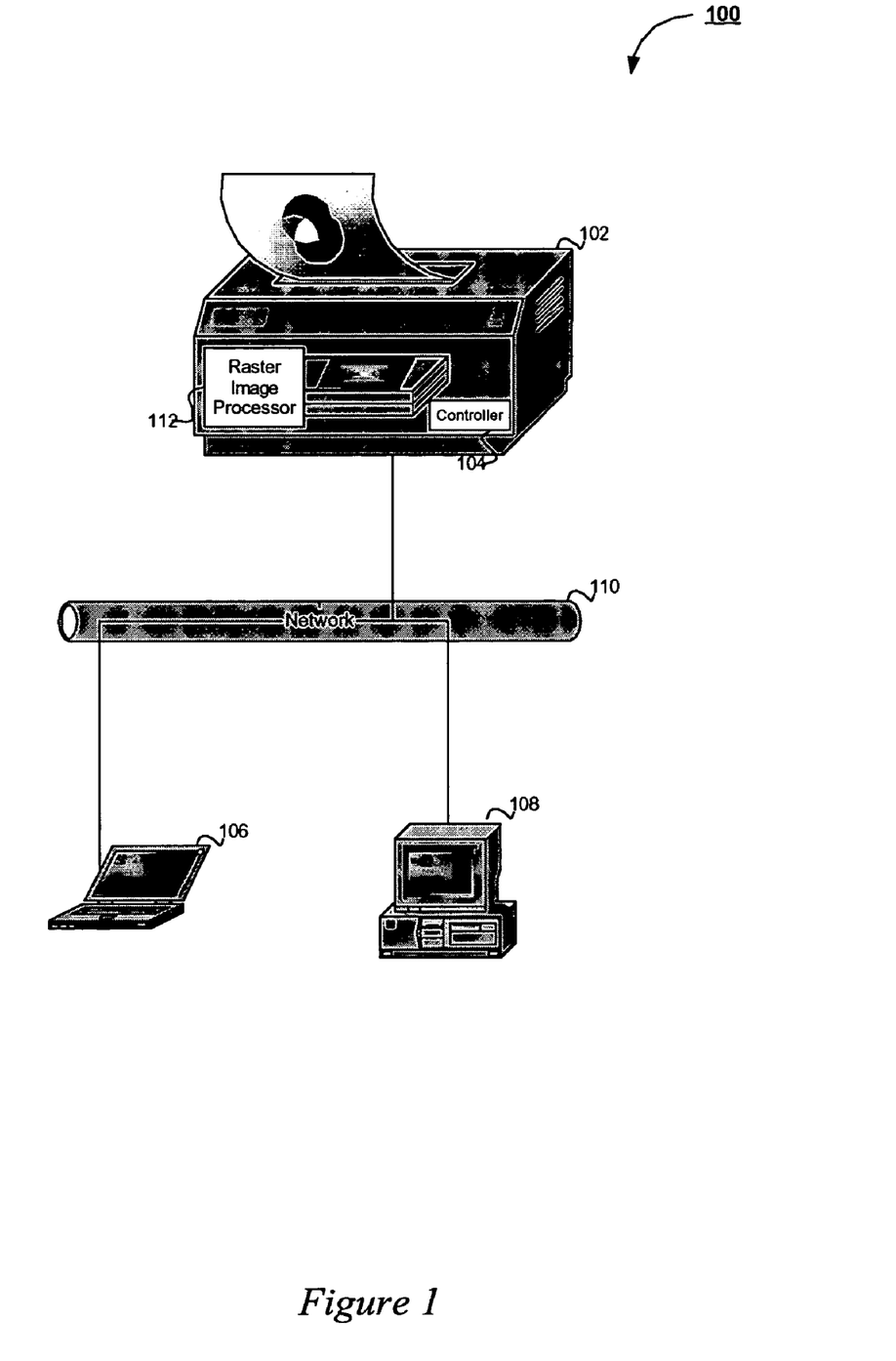
FIG. 1 is a block diagram of the system according to the present invention.

The present invention is directed to a method and apparatus for raster image processing which uses page buffer management. A diagram illustrating the system 100 is shown in FIG. 1. The system 100 depicts a typical business office network, suitably comprising a shared image processing device 102. It will be appreciated by those skilled in the art that the use of a networked image processing device in the system 100 is for exemplary purposes only. The subject invention is equally adaptable for use in a single computer/image processing device. Furthermore, the image processing device is any suitable image processing, or document processing device known in the art, e.g. a facsimile, a printing device, a scanning device, a copying device and a multifunction peripheral device.

A controller 104 is in operative connection with the image processing device 102. The controller 104 is any suitable printer controller known in the art and is capable of implementation internal to the image processing device 102 or as a separate electronic device in data communication with the image processing device 102. The image processing device 102 is connected to one or more personal computers or workstations, depicted in the system as 106, 108. The personal computers 106, 108 are suitably connected to the image processing device 102 via a computer network 110. As will be understood by those skilled in the art, the computer network 110 is any suitable network, such as Ethernet, Token ring, wireless, or the like.

Image data is transmitted from the personal computers 106, 108 to the image processing device 102 over the computer network 110. The image data is suitably encoded in a myriad of possible formats as will be appreciated by one of ordinary skill in the art. This image data is received by a raster image processor 112 in order to perform raster image processing on the image, transforming the image data in data recognizable by the printer engine (not shown). The subject invention relates to a raster image processor employing a page buffer manager. The subject application will be better understood by referencing the charts of FIGS. 2, 3 and 4.

Figure 2:
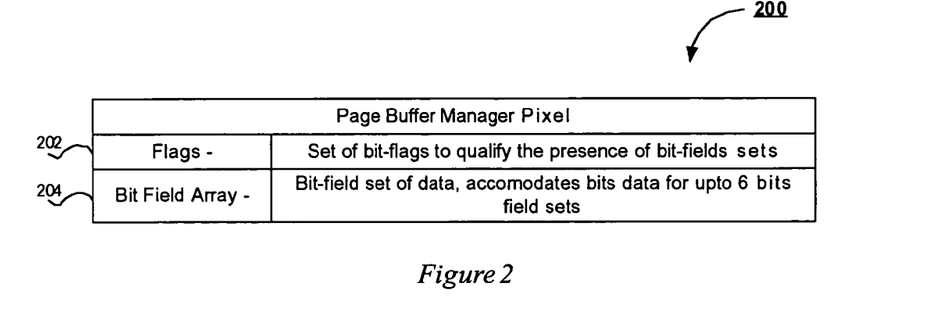
FIG. 2 is a table illustrating a pixel according to the present invention.

Turning now to FIG. 2, there is shown a general tabular representation of the pixel data 200 used by the page buffer manager of the subject invention. The data 200 comprises flags 202 and a bit field array 204. The flags 202 are suitably a set of bit flags qualifying the presence of bit field sets. The bit field array 204 suitably comprises bit field sets of data, accommodating bit data for up to 6 bit field sets. More particularly, each member of the flags set 202 comprises one byte of data. As will be understood by those skilled in the art by the disclosed embodiment, 6 bits are allocated for any purpose used by the page buffer manager. The six bits of each flag are used to indicate the presence or absence of one of the bit fields. It will be understood by those skilled in the art that every bit field in the bit field array 204 is capable of being configured to correspond to colorant or any other application-specific data. These flags 202 give an initial compression of the pixels, enabling the page buffer manager to allocate memory only for those bits that are present in a particular pixel 200.

Figure 3:
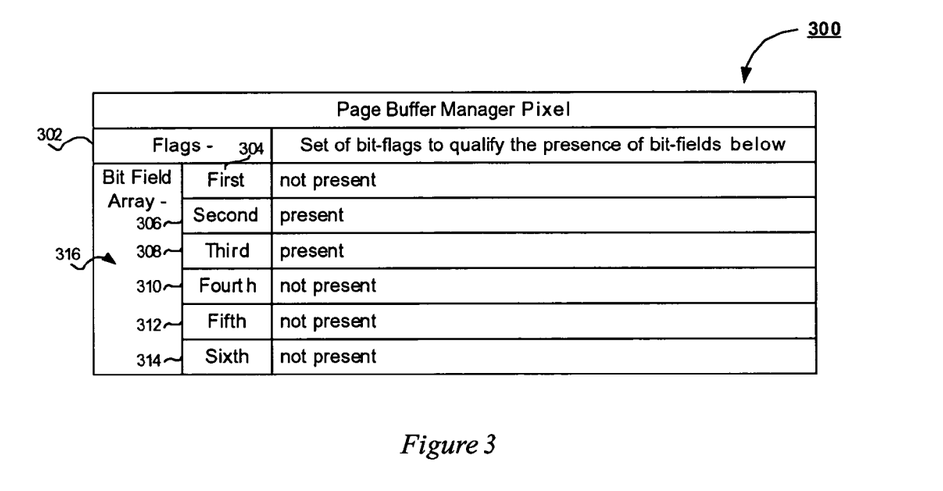
FIG. 3 is a table illustrating a detailed pixel according to the present invention.

For example, FIG. 3 shows a tabular representation of a pixel 300 used by the page buffer manager of the subject invention. The example of FIG. 3 shows the flags byte 302 has a value of 0x06, or 00000110 in binary, then the pixel only requires second and third bit fields, and the data 300 is depicted accordingly in FIG. 3. The bit field array 316 suitably comprises six bits 304, 306, 308, 310, 312 and 314. As previously stated, the second 306 and third 308 bits are present, while the first 304, fourth 310, fifth 312 and sixth 314 bits are not present. The use of the aforementioned pixel structure eliminates the need to allocate space to simply describe the absence of the first 304, fourth 310, fifth 312 and sixth 314 bits. The original order of the bit fields 316 is maintained, eliminating only the "0" bit fields as appropriate.

As will be understood by the skilled artisan, the pixel used by the page buffer manager of the subject invention provides a relatively compact record of pixel characteristics. Allocations for every single pixel and the maintenance of all related control structures requires substantial system resources in both memory and processor time. Therefore, the subject page buffer manager does not require the internal storage of information of every single pixel. Instead, the page buffer manager groups all sequential pixels into chunk structures. Every chunk structure keeps information about a fixed range of 64 pixels. The skilled artisan will understand that any chunk will exist if at least one pixel in its range has ever been written by the raster image processor, so all other pixels in the chunk are also considered as existing, even if they have not been addressed by the raster image processor. Additionally, all bit-fields within a data set are compacted together to create bit fields data sets with a size varying between 8 and 256 bytes. In the illustrated embodiment, the minimum size of a bit field is 1 bit and the maximum size is 32 bits. The skilled artisan will appreciate that the above minimum and maximum bit sizes, coupled with the 64 pixels in chunk, give a range of 1×64 to 32×64, or 8 bytes to 256 bytes.

Figure 4:
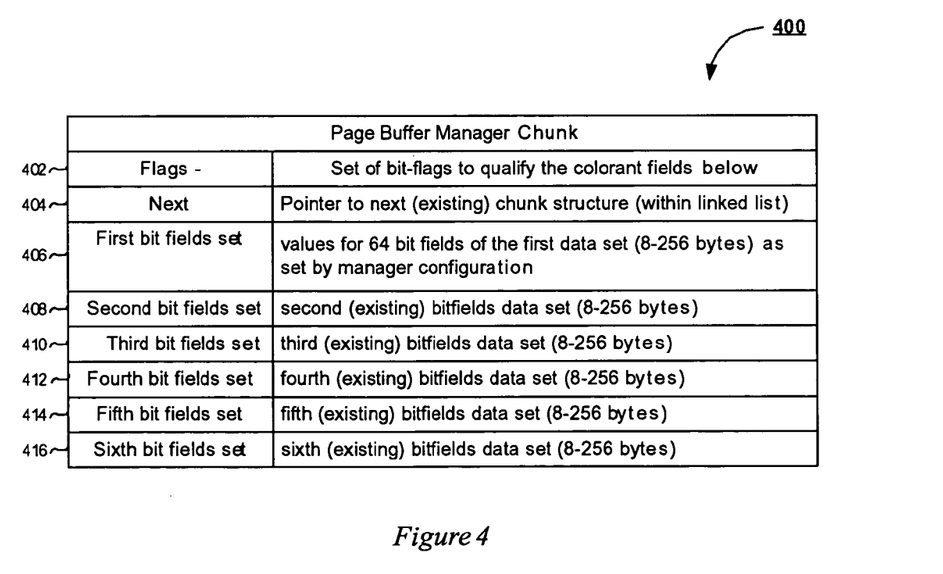
FIG. 4 is a table illustrating a pixel chunk according to the present invention.

The size, in number of bits, of every data set is fixed for each page buffer manager installation, and is selected by a user at the time of installation. Turning now to FIG. 4, there is shown a tabular representation of a chunk 400 used by the page buffer manager of the subject invention. The chunk 400 includes flags 402, which are a set of bit flags to qualify the colorant fields set forth in the data included in the chunk 400. A pointer 404 points to the next existing chunk structure within a linked list of chunks. The chunk 400 also includes six field bit sets 406, 408, 410, 412, 414, and 416. The first bit fields set 406 includes values for 64 bit fields of the first data set, which varies from 8 bytes to 256 bytes, depending upon the page buffer manager configuration. The second 408, the third 410, the fourth 412, the fifth 414, and the sixth 416 bit fields sets similarly contain data sets of 8 bytes to 256 bytes.

The skilled artisan will appreciate that whenever the raster image processor writes even a single pixel at some location, there is a high probability that it will write another nearby, and most likely the other pixel will be adjacent to the first pixel, having the same colorants, albeit with different color values. Thus, if the raster image processor writes any single pixel and the appropriate chunk has been created, on the next write into another pixel within the same chunk the raster image processor suitably accesses chunk data without needing to do any allocation. Therefore, every chunk's structure allocation is performed on an 'as requested' basis. The skilled artisan will understand that only those bit field sets, such as color components and the like, with non-zero values for any pixel in a chunk, will be present in the chunk structure. Furthermore, as will be evident to one skilled in the art that no chunk will be generated until at least one of its associated pixels has been written by the raster image processor.

Figure 5:
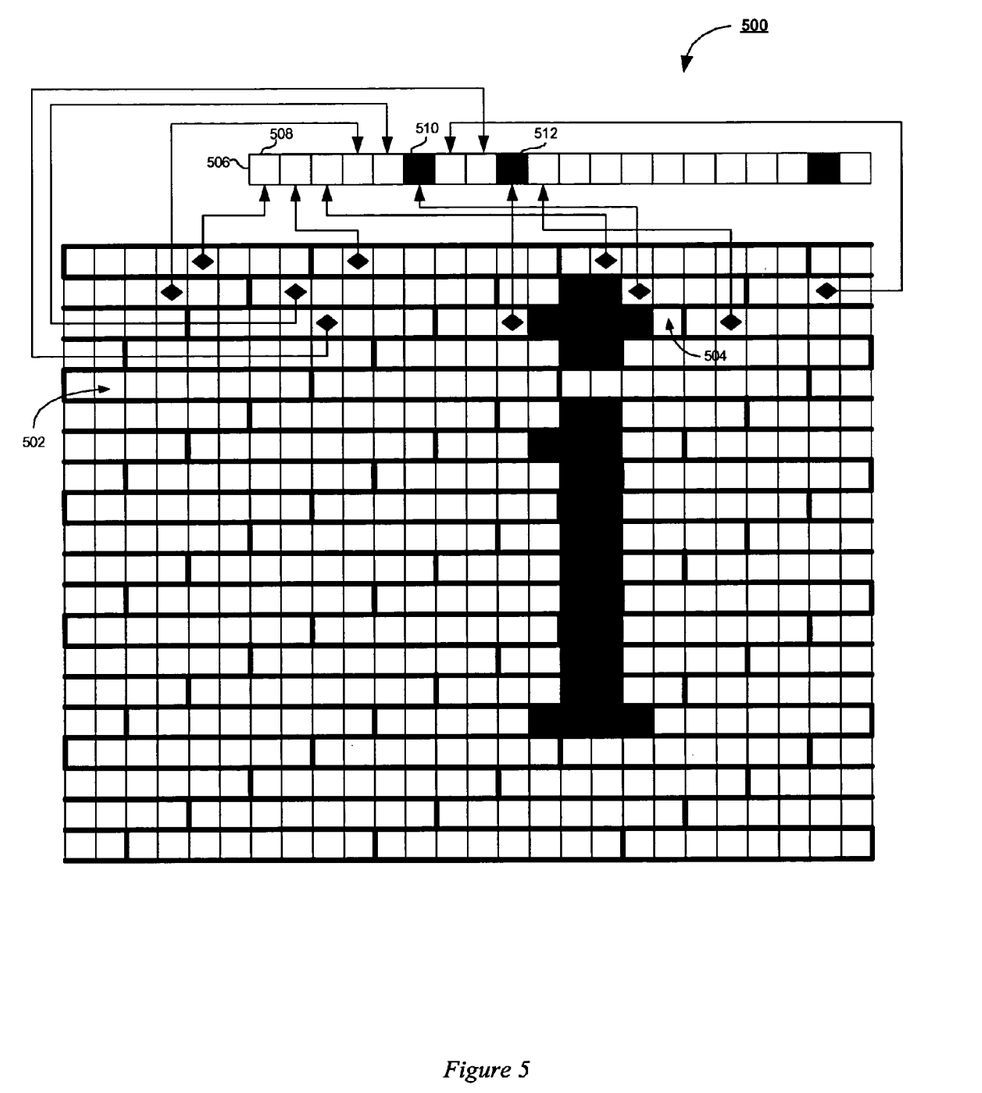
FIG. 5 is a page buffer manager page map according to the present invention.

The chunk format used by the page buffer manager provides a compact record of the characteristics of the pixel chunks, however it does not record the location of that chunk. The subject invention uses two data structure techniques to facilitate the recordation of the location of the chunk. The first technique used by the page buffer manager for chunk mapping is a bitmap 500, as represented by FIG. 5. The bitmap 500 records the creation of any chunk on the page as a single bit. The bitmap 500 is organized as an array of 64 bit integers. As shown in the bitmap 500 of FIG. 5, an empty chunk is exemplified at 502 while a non-empty chunk is exemplified at 504. A chunks map, or page bits map, represented at 506, functions as an index for the array and is calculated prior to indexing the chunks. The map 506 includes, for every empty chunk 502, an empty bit 508, while for every non-empty chunk 504, a non-empty bit is included in the map, exemplified at 510 and 512.

The organization of FIG. 5 enables the compact indexing of chunk structures. However, addressing all chunks on a page using a page bitmap technique as an array of bits is very expensive in terms of computing time required. Bit counting of a nearly full page can cause an unacceptable load due to the need to traverse all of the bits of the page map. For example, when the last chunk of a page is addressed and the page already has a significant percentage of coverage, then all chunks will need to be traversed to get the next chunk pointer. This traversing continues until the desired chunk is found. To avoid such circumstances, the page buffer manager of the subject invention employs a second technique, a scan-lists structure, to enable fast indexing.

Figure 6:
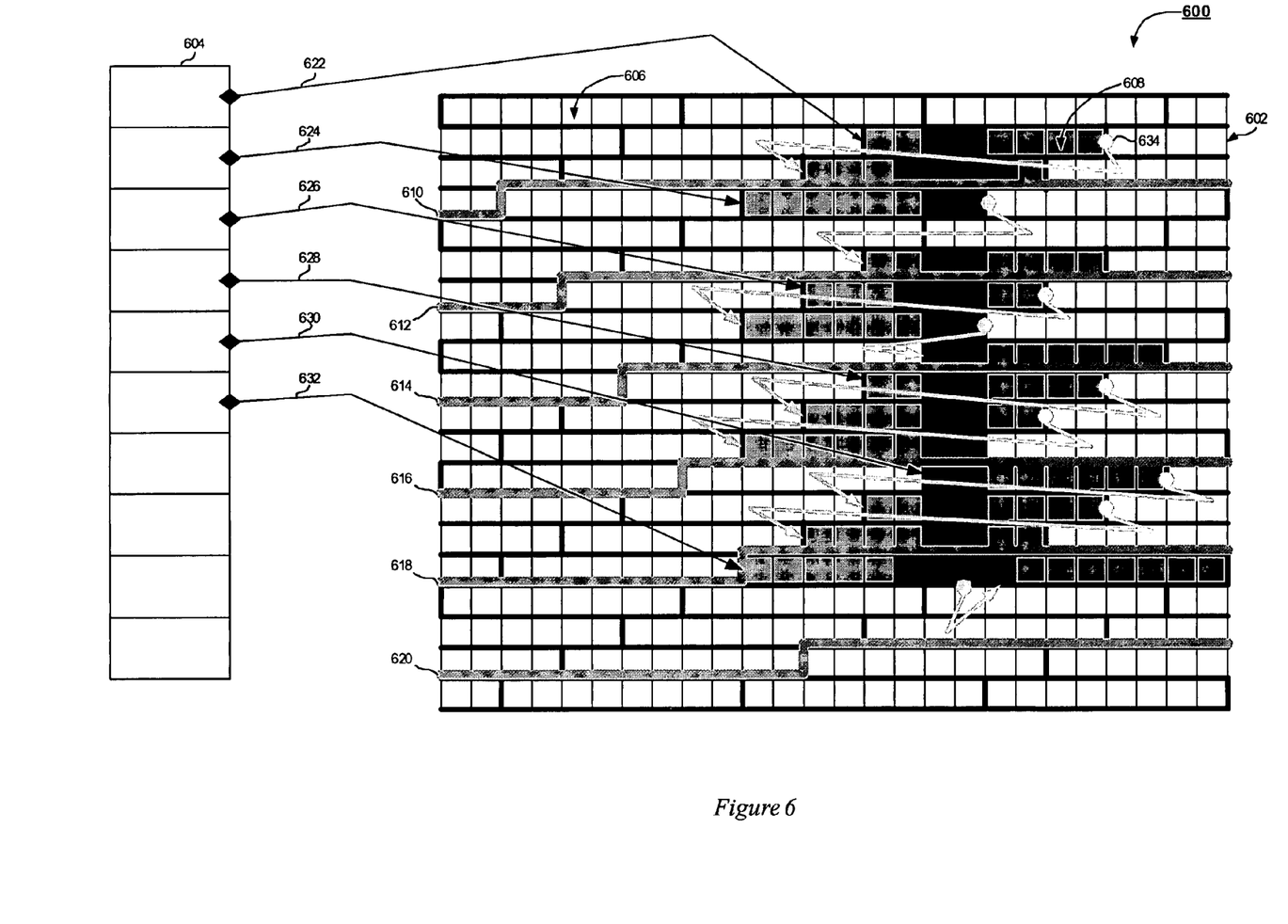
FIG. 6 is a page buffer manager scan list page map according to the present invention.

The second technique, illustrated as 600 in FIG. 6, includes a bitmap 602 and a listing of scan lists 604. An empty (non-existing) chunk is exemplified by 606, while an existing chunk, e.g., a chunk having at least one bit present, is exemplified by 608. As shown in FIG. 6, the page buffer manager maintains a secondary chunk indexing structure in the list 604 of pointers for groups of 64 chunks, 610, 612, 614, 616, 618, and 620, as an indexed array, the pointers exemplified by reference numbers 622, 624, 626, 628, 630, and 632. Each pointer, or element, in this array points to the first existing chunk in a group. For example, pointer 622 points to the first existing chunk 607 in the first group 610 of 64 chunks. A next pointer 634 from the previous chunk 608, i.e., a one-directional linked list, references all the following chunks in this group 622. Thus, every scan list 612, 614, 616, 618, and 620, directly corresponds to the page map element with the same index, because both represent the same 64 chunks.

The skilled artisan will appreciate that using the structure described with respect to FIG. 6 together to encode positional information for every chunk on a page results in all existing chunks becoming ordered and accessible. It will further be appreciated that the combined use decreases the memory requirements for preallocated structures for an entire A3 page to about 162K bytes for the page bitmap, and approximately 80K bytes for the scan lists array. This further permits two ways of addressing parts of a page, first by giving a clear, compact and direct indication of existence for every chunk on the page; and second, by computing the position of every allocated chunk within the linked-lists structures. In other words, this structure helps to indirectly encode, and decode, the location of each chunk on a page when the linked list structures, i.e., scan lists, are in use.

To summarize the above chunk mapping, every element in the page map array of 64 bit integers is advantageously used in several ways for addressing purposes. First, a fast verification of existence of a scan list is suitably performed by a simple comparison to zero, thereby checking for the existence of all 64 chunks of the scan list. Second, the number of bits of an element corresponds directly to the number of chunks in the linked list, further providing the size of the scan list. Third, bits in the element allow for encoding and decoding of the position of every chunk on a page, which are then used to map X/Y coordinates into chunks structures indexes, when the chunks are addressed. The skilled artisan will understand that every element of the scan list serves as an entry point into every of 64 chunk sequence, eliminating long linked-list scanning because it is always limited to 64 elements, and only for the worst case of 100% toner coverage of a page. Every element of a scan list also enables similar (using the same index) addressing of page map structures because page maps are also organized as indexed arrays of 64 bit values.

In application of the subject invention to image processing, an analysis of the worst case scenario, e.g., the raster image processing of a maximum paper size with a relatively high dots-per-inch (dpi). For example, a maximum paper size of 19"×12", at 600×600 dpi, requires approximately 82,080,000 pixels. Preservation by the page buffer manager of the subject invention of coordinate data for every pixel, total memory required for coordinate data alone is determined by the following:

$$82,080,000 * ((\text{2-bytes } X\text{-coordinate}) + (\text{2-bytes } Y\text{-coordinate})) = 328,320,000$$

which is roughly equivalent to 320 MB, which is prohibitive. However, in using the page buffer manager page map, as set forth above, the necessary memory required to determine pixel locations is reduced to:

82,080,000/64/8=160,312 and memory required for keeping scan lists pointers (4 bytes each) is:

(82,080,000/64/64)*4=80,156 giving a total memory requirement of:

160,312+80,156=240,468 or roughly 240 KB required for preallocation.

The skilled artisan will appreciate that the above calculations do not take into account the amount of memory required for the chunk data. Thus, the total amount of memory used is roughly equivalent to 417 MB:

82,080,000/64=1,282,500 (total number of chunks on page)

1 byte of flags+4 bytes for next pointer=5 bytes of chunk controls 1,282,500*(64*5 chunks data+5 bytes of chunks controls)=416,812,500 bytes.

While this amount is also prohibitive, it will be appreciated that the worst A3 page possible is capable of compression to 72 MB. Thus, an A3 page at 420 mm (16.8")×297 mm (11.88") is roughly 87% of the worst case page of 19"×12" previously discussed. Alternatively, the 19"×12" page is roughly 14% larger. Assuming that the compressed data (72 MB) will also grow 14%, the likely maximum memory required for colorants is:

72 MB+(72 MB*14%)=82 MB

As will be understood by those skilled in the art, the typical case requires only 25% coverage across all color planes. Therefore:

1,282,500/4*(64*5+5)=104,203,125 bytes

Thus, many or most pages will fit into the memory of the raster image processor without compression.

The chunks and related indexing structures are all that is required to accurately record the details for a page, except that the list could potentially exhaust the system's memory resources whenever any page has a greater than average pixel coverage. To improve performance, the page buffer manager of the present invention will keep chunks in an uncompressed form until one of three conditions arise. The first condition is the engagement of a garbage collector, a mechanism for releasing fragmented memory, which indicates that the system is running low on available memory space. The second condition is when the raster image processor has finished a page, to prepare it for handover to the raster image processor manager, when any compression is negotiated. The third condition is when the central processing unit of the image processing device is in an idle cycle.

Basic Run Length Encoding compression is suitably used to compress colors bit fields data. When a chunk requires compression at any stage, a new compressed chunk is created and old, uncompressed, memory is released. Compressed chunks inherit the data format of uncompressed chunks. However, those skilled in the art will understand that bit field data, e.g., colors and tags, cannot be directly addressed. Therefore, all 64 values for each bit field are compressed sequentially and kept as a single compressed stream. While in compressed form, all colors and tags data lose any positional information, and cannot be addressed and referenced directly. Thus, all chunks are always decompressed whenever any access into any their pixels is required. The page buffer manager does not enforce the compression of chunks; rather a more general policy of the raster image processor enforces the compression of chunks. The page buffer manager application program interface is capable of employing compression techniques suitable to reclaim sufficient quantities of memory.

The skilled artisan will appreciate that the use of the run length encoding algorithm for compression of the present invention was selected for its performance with respect to solid filled areas and repetitive sequences, however other compression algorithms are capable of being employed without departing from the scope of the subject invention.

In most circumstances, compression is avoided due to the high performance overhead and the complications involved in the sorting, reconciliation and reading requirements of the page buffer manager in general. Once compressed, the page buffer manager must now write into compressed space, and conversely, many operations must be read from the compressed space. Once chunks have been compressed, the page buffer manager operates in compressed space. Any reading or writing of any pixel or band into chunks that is already compressed will require decompression of all of the chunk's data and compression again if any data has been changed in the writing. The preferred embodiment of the subject invention employs a page buffer manager implemented to enable the raster image processor to maintain compressed and uncompressed chunks simultaneously in memory. This enables flexibility of compression control and avoids excessive recompression cycles for chunks that are kept in memory as compressed.

In accordance with the present invention, any chunk that has been compressed and subsequently accessed, is decompressed and kept in uncompressed form for a selected period of time. The page buffer manager implements a compression cache such that uncompressed chunks are inserted into the cache. As implemented, it is the caching systems responsibility to decide when a chunk actually should be compressed. The cache maintains records of the most recently accessed chunks and, when a predetermined limit is exceeded, the cache attempts to compress one of the least-recently used chunks, and places the last accessed chunk into the top of the cache.

It will be appreciated by those skilled in the art that limits on the number of chunks that are kept as uncompressed when working in compression mode are suitably predefined or dynamically changed, depending upon the current memory consumption. Under such circumstances, the page buffer manager balances the amount of memory used for uncompressed chunks, thereby compressing chunks only when limit is going to be reached, keeping as many chunks uncompressed as is possible. Alternatively, the page buffer manager is capable of reducing excessive compression cycles by compressing chunks once a predefined condition is met, e.g., memory limit for uncompressed chunks. Thereafter, once chunks which have to be read are decompressed and kept uncompressed until the predefined condition is met again.

Figure 7:
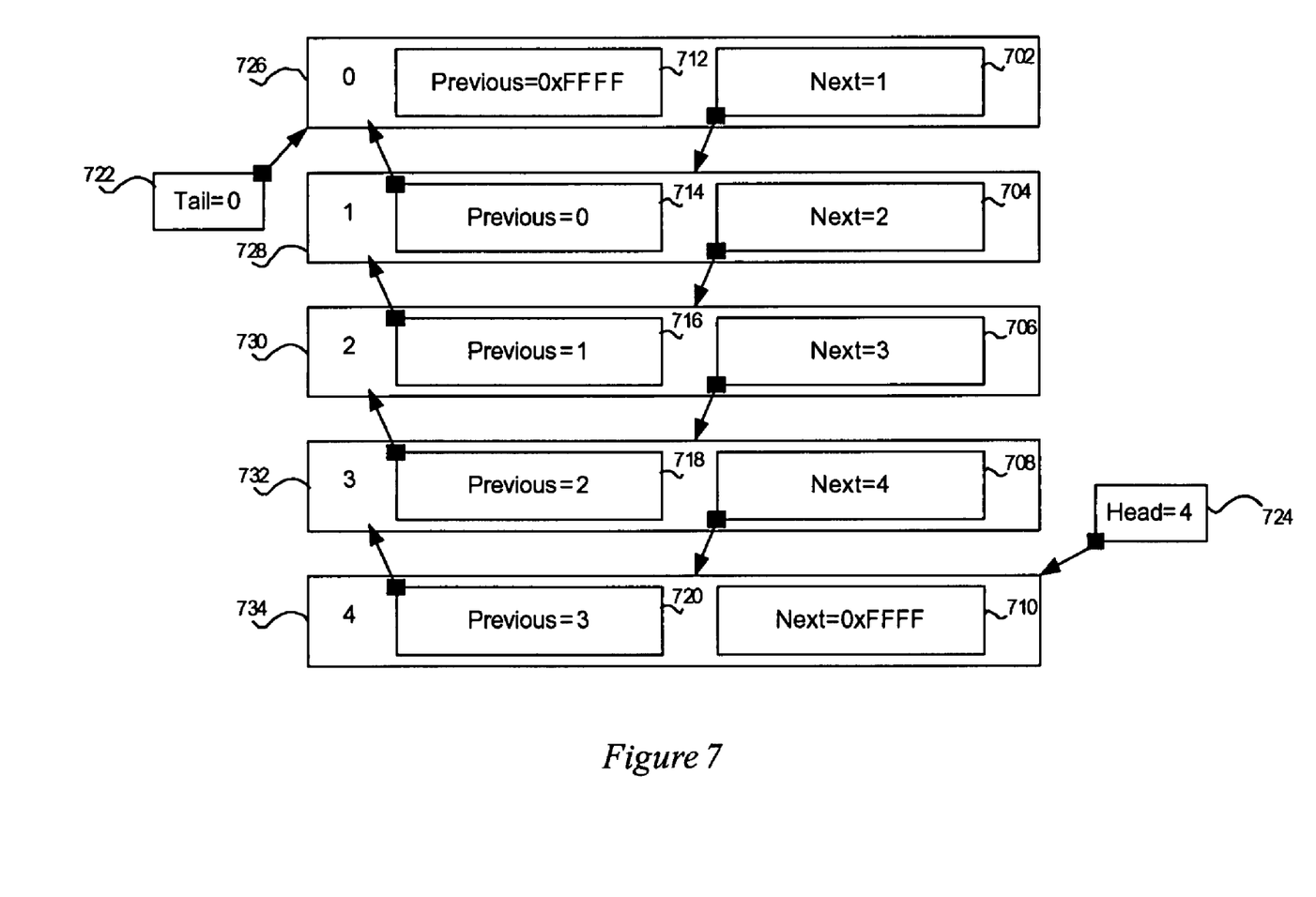
FIG. 7 is a table illustrating a basic least recently used cache according to the present invention.
Figure 8:
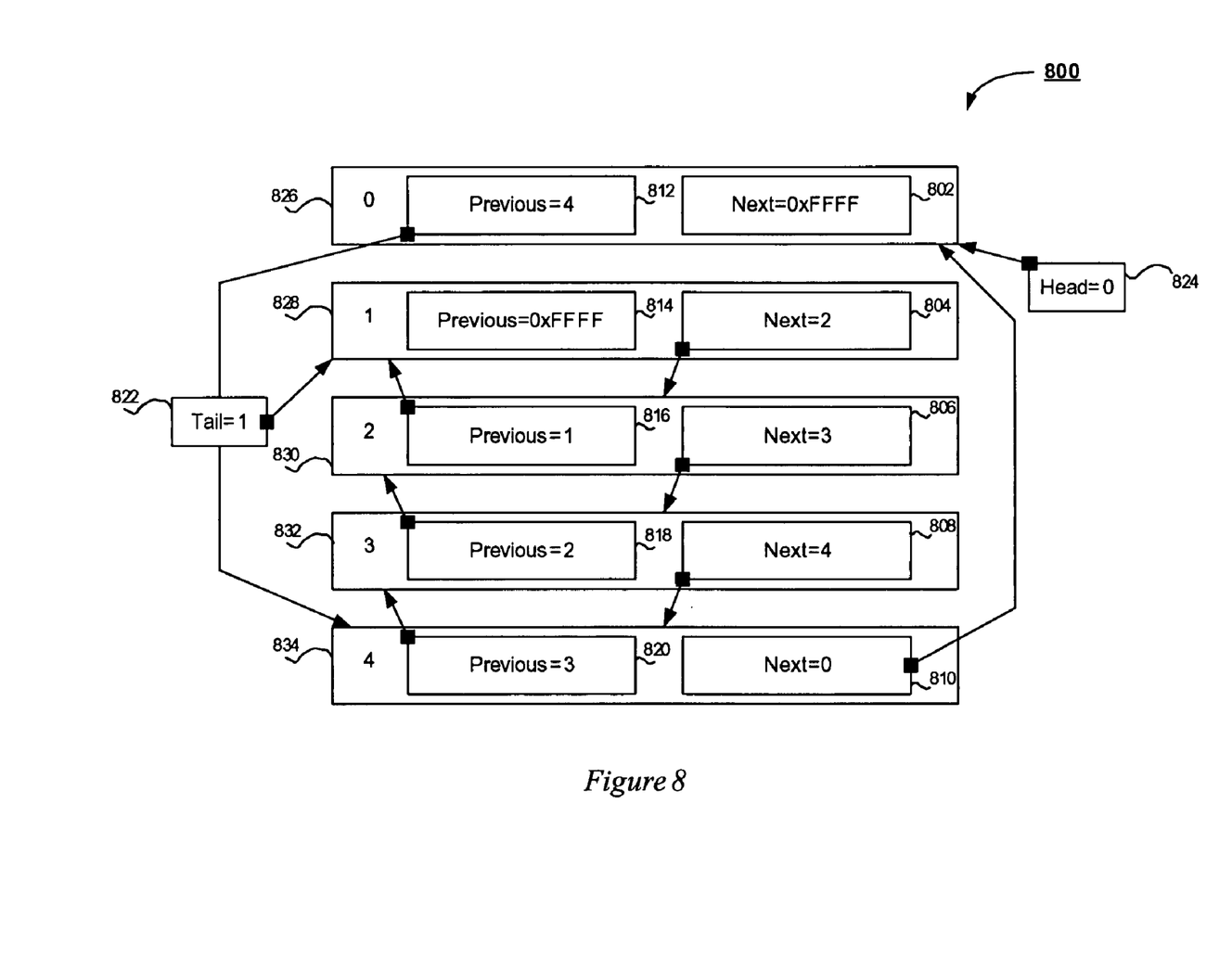
FIG. 8 is a table illustrating an application of the least recently used cache according to the present invention.
Figure 9:
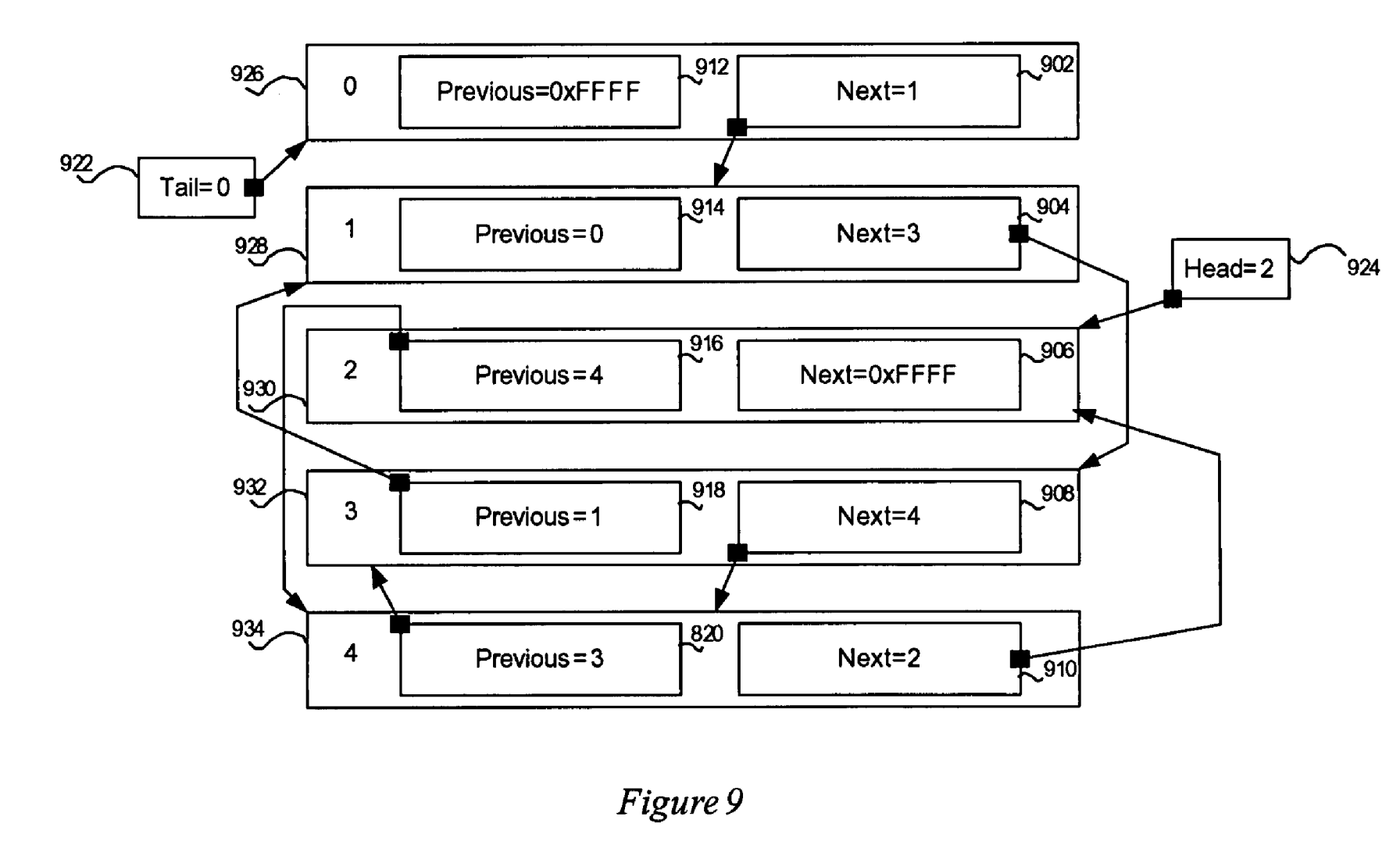
FIG. 9 is a table illustrating an alternate application of the least recently used cache according to the present invention.

A more detailed explanation of the caching procedures of the subject invention will now be addressed with reference to FIGS. 7, 8 and 9. At the beginning of every page buffer manager session, all required caching structures are allocated for use. It will be appreciated by those skilled in the art that the caching structures are also capable of being allocated on the first compression event. A least recently used cache is allocated with an index table and chunk pointers. As will be understood by those skilled in the art, least recently used refers to a rule used in a paging system which selects a page to be paged out if it has been used (read or written) less recently than any other page. The same rule may also be used in a cache to select which cache entry to flush. This rule is based on temporal locality, i.e., the observation that, in general, the page (or cache entry), which has not been accessed for longest is least likely to be accessed in the near future. The index table is of fixed size and serves as the main least recently used linking scheme. The chunk pointers maintain links between least recently used entries and actual data chunks.

The index table contains two sets of indices, an index of previous least recently used structures and an index of next least recently used entries. The index of previous least recently used structures enables quick access of the logically previous entry in the cache. The least recently used entry of the least recently used cache is always located at the "tail" end of the least recently used list. When the value of this index is 0xFFFF (reserved a no-previous entry for this index), the entry will be the first subject for compression whenever such compression is required. It will be appreciated by those skilled in the art that indexes within least recently used structures begin at 0, and one value is reserved for special cases, i.e., 0xFFFF. This yields 65,534 addressable cache entries. The index of next least recently used entries also enables two-directional referential integrity of the least recently used list and, as the name indicates, references the more recent entry in the least recently used list.

Turning now to FIG. 7, there is shown a table representative of a least recently used cache 700 filling for five entries, e.g., chunks, 726, 728, 730, 732, and 734. It will be understood by the skilled artisan that the chunks 726, 728, 730, 732, and 734, next pointer 702, 704, 706, 708, and 710, respectively, are altered once the chunk 726-734, is cached. Thus, next pointers 702-710 then contain an index in the least recently used cache representing its respective location within the cache 700. Similarly, previous pointers 712, 714, 716, 718, and 720 point to the chunk 726-734, respectively, immediately preceding the chunk in which the previous pointer is located. When a chunk 726-734 is not in the cache 700, the respective next pointer 702-710 points to the next chunk 726-734, in the scan list.

Chunk pointers 702-720 function as links to the chunks corresponding to each cache entry 726-734. This enables the reallocation, i.e., change in memory location, of a chunk upon the occurrence of an alteration of a chunk structure, i.e., inserting or removing any color plane. To maintain the integrity of the page buffer manager scan lists, least recently used cache chunk entries include not only pointers to the next entry (next chunk in the scan list) 702-710, but also to the previous entry 712-720 (preceding chunk in the scan list). It will be understood by the skilled artisan that the next pointers 702-710 correlate in meaning to the next pointer (not shown) of the chunk itself. However, because the next pointer (not shown) in the chunk has lost its significance upon installation into the cache 700, the least recently used structure provides a corresponding replacement (next pointers 702-710) to keep reference for every chunk in the scan list.

The previous pointers 712-720 maintain reference to each previous chunk 726-734, respectively, within the scan list. This permits updates of the previous chunk 726-734 whenever a cached chunk is reallocated. It will be understood that the previous pointers 712-720 are advantageously examined during scan list traversing in every API call that accesses chunk data, due to all chunks 726-734 within the scan list that are located prior to the desired chunk being examined.

In addition, the page buffer manager maintains two indexes for every least recently used cache, a head and a tail. Referencing FIG. 7, the head index 724 points to the first logical entry and the tail index 722 points to the last logical entry. As will be understood by those skilled in the art, the head 724 will be the last used chunk, while the tail 722 points to the oldest chunk in the cache 700. The indexes 724 and 722 are updated upon every insertion into the cache 700. Upon insert, a new chunk will be inserted into the head of the least recently used cache 700, addressed by the head index 724, and in the event that the least recently used cache 700 has reached capacity, the chunk referenced by the tail index 722 will be sent to compression and removed from the cache 700.

Entries in the least recently used cache 700 are filled in sequential, beginning from first (index 0) to maximum (index 65534) until all entries in the cache 700 are used. As will be understood by those skilled in the art, when the least recently used cache 700 becomes full, the logical order will be 0-1-2-3-4, or 726-728-730-732-734, where the tail index 722 points to the least recently used entry, or 0 (726) and the head index 724 points to the last used entry, or 4 (734).

FIG. 8 illustrates a least recently used cache 800 that has become full, i.e., the currently allocated index has reached maximum. It will be understood by those skilled in the art that for purposes of explanation, five entries are used. The subject invention, as stated above, typically incorporates up to 65,534 entries. As shown in FIG. 8, the least recently used cache 800 has lost its numerical order, but logical order is still maintained because the head index 824 and the tail index 822 are adjusted accordingly and still point to the last used entry 0 (826) and the least recently used entry 1 (828). Thus, the new logical order is 1-2-3-4-0 (828-830-832-834-826), with the tail index 822 pointing to 1 (828) and the head index 824 pointing to 0 (826). It will be apparent to one skilled in the art that the next pointers 802-810 and the previous pointers 812-820 have also been updated, reflecting the change in the last used entry 826 and the least recently used entry 828.

When access is requested for a chunk that is already present in the cache 800, only internal least recently used cache 800 indexes will be changed, i.e., no chunk will be sent to compression. However, the requested chunk that is accessed is then moved to the head of the least recently used list, i.e., the requested chunk becomes the last used chunk. The skilled artisan will appreciate that this also results in the loss of numerical order, however, the logical order of the entries will be maintained.

For example, turning now to FIG. 9, there is illustrated a case wherein access is requested for a chunk 930 that has a numerical entry of 2 in the least recently used cache 900. For purposes of this example, the initial state of the least recently used cache 900 was previously the cache 700 of FIG. 7. As shown in FIG. 9, the chunk 930 was requested, thereby resulting in the head index 924 pointing to the chunk 930. The tail index 922 remains unchanged, pointing to same least recently used chunk 926 because no new entries were made to the cache 900, as opposed to the new entry made in cache 800 of FIG. 8. The next pointers 902-910 have been updated to reflect the accessing of chunk 930, and to maintain the correct logical order of 0-1-3-4-2 (902-904-908-910-906). In a similar manner, previous pointers 912-914 have been updated to reflect the accessing of chunk 930, and to maintain the correct logical order of 0-1-3-4-2 (912-914-918-920-916). The skilled artisan will appreciate that the preceding procedure of FIG. 9 is easily adaptable to a request to access the tail member 912 of the cache 900. Thus, the head index 924 would point to the chunk 912 and the tail index 922 would subsequently point to the least recently used chunk 914. Correspondingly, the previous and next pointers are updated with new values.

The aforementioned FIGS. 7, 8 and 9 not only demonstrate the implementation of the least recently used caching replacement policy, but also enable fast access to any chunk in any corresponding least recently used cache. Maintenance of all corresponding linking between chunks in the least recently used cache is also accomplished via the use of previous and next pointers. The skilled artisan will appreciate that when the least recently used cache becomes full, the least recently used member is flushed from the cache to make space for the new, more recent entry. The old chunk, i.e., the chunk being flushed, is converted into a compressed form and appropriate page buffer manager scan lists are updated to represent its new memory location and former tail entry in the least recently used cache.

As previously mentioned, the subject invention uses the run length encoding algorithm for compression of the chunks. The first byte, i.e., the header byte, in a compressed run sequence contains information about the run-length type and length. For example, the type of run is encoded into the first 2 bits and the length of the run is encoded into the lower 6 bits. The subject invention uses the first 2 bits in a header set as 00 for uncompressed runs or 01 for compressed runs. The format for the uncompressed run includes a header, followed by the uncompressed bytes sequence, and the length of the sequence contained in the lower 6 bits of the byte. The format for the compressed run includes a header, followed by one byte, the encoding sequence of this byte by length, and encoded in the lower 6 bits of the header is the length of the sequence. The 6 bits of the header give a value from 0-63 and while 0 equates to no data, it is used to represent a special circumstance for compressed runs, e.g., everything is the same as the previous run, so it is adopted for faster encoding of solid areas. It will be understood by those skilled in the art that all runs are encoded sequentially for every colorant, and the encoded sequence for every colorant results in 64 bytes upon decompression.

It will also be appreciated by those skilled in the art that the subject invention need not be limited to using 6 bits for encoding of the run length. Thus, an alternate embodiment of the subject invention uses a dynamic run length encoding that operates on whole chunk data as a single bytes-stream, wherein all color-planes are concatenated into a single data block. The skilled artisan will understand that such an implementation of run length encoding enables the arbitrary selection of lengths of data.

Continuing with this embodiment, when a special condition exists, i.e., extended length, the 6th bit (7th when counting begins with 1) is set. The lowest 6 bits of the first run length byte are kept, giving the 0-64 range mentioned above. When the extended length bit is set, the next byte in the compressed stream is used as an extension for the run length value. Thus, all sequential run length extensions are concatenated by taking the 6 bits of the first byte to ascertain the length value. Next, the length value is shifted by 7 bits (from low to high bit), and the lower 7 bits are assigned from the next byte to the length. When the extension bit (highest bit) of the next byte is set, the length value is shifted by 7 and the lower 7 bits of the third byte are assigned to the length.

For example, encoding of 0-64 lengths is accomplished in 1 byte, $(6+7)\char`\^=>(1\ldots 169)$ in 2 bytes, $(6+7+7)\char`\^2=>(1\ldots 400)$ in 3 bytes, $(6+7+7+7)\char`\^2=>(1\ldots 729)$ in 4 bytes, $(6+7+7+7+7)\char`\^2=>(1\ldots 1156$ in 5 bytes and so on. As will be understood by those skilled in the art, the encoding of the dynamic run length compression is backward compatible with the decompression of encoded data, as discussed herein.

The page buffer manager of the subject invention includes a variety of methods for placing pixels into compressed space. Thus, when the raster image processor attempts to access, e.g., read or write, any pixel into a page that has a compression mode set, one of the following conditions for compression space occurs. First, the chunk doesn't exist, second the compressed chunk exists, and third the uncompressed chunk exists. When the chunk does not exist, the uncompressed chunk of pixel is assigned into the scan lists and inserted into the cache. When the compressed chunk already exists, it is decompressed, the pixel data is updated and the chunk is reassigned into the scan lists and inserted into the cache. When the uncompressed chunk exists, plain data-copying occurs from the pixels into a chunk.

It will be understood that the raster image processor is able to write other colorants into the pixels when space is not allocated for this color. The uncompressed chunk then grows to accommodate the new color plane. The compression management routine of the subject invention determines the current state for an accessed chunk and performs appropriate calls and list management, to get the accessed chunk into an uncompressed form. It will be apparent to the skilled artisan that every insertion into the cache of uncompressed chunks can result in the cache limit being reached. The least recently used cache then selects the oldest uncompressed chunk and compresses it, then removes it from the cache list and updates the page map.

As previously discussed, a variety of chunk states exist, compressed, uncompressed and cached, as well as a plurality of conditions, which require registration in a scan list. To accomplish the determination of chunk states, several bits in the flags field of the chunk are used:

00 000000—chunk in uncompressed form 01 000000—chunk in compressed form 10 000000—chunk is uncompressed, cached and not the first chunk in list 11 000000—chunk is uncompressed, cached and is the first chunk in list A chunk with 00 000000 in the flags field indicates that the chunk is in uncompressed form and directly accessible and reallocatable. A chunk with 01 000000 in the flags field indicates that the chunk is in compressed form, so immediate access is not possible, the chunk should be converted into cached form (uncompressed) prior to use. A chunk with 10 000000 in the flags field indicates that the chunk is cached and uncompressed, but it is not the first chunk in the scan list. Direct access of this chunk is possible, but any reallocation of the chunk requires updating of the next and previous pointers. A chunk with 11 000000 in the flags field indicates that the chunk is cached and uncompressed and is the first chunk in the scan list. Direct access of this chunk is possible, however any reallocation of the chunk requires updating of the next and previous pointers and the scan list. Furthermore, the cached previous pointer keeps the scan list index so that appropriate scan list entries can be updated whenever reallocation of this particular chunk occurs. The skilled artisan will understand and appreciate that the 8th bit indicates the caching state of a chunk and the 7th bit is context sensitive, i.e., compression state for not-cached chunk and scan list position for cached chunks. It will be understood by those skilled in the art that any decompression of a chunk will cause the newly decompressed chunk to be installed at the head of the least recently used cache. The actual number of color planes that the cached, i.e., uncompressed, chunk should have will depend upon the actual colors that the compressed chunk contains.

In addition to the foregoing, it will be appreciated that the page buffer manager of the subject invention is capable of user configuration in accordance with data requirements and compression management strategies. The preferred embodiment of the subject invention enables up to 6 bit field planes, with every bit field configured to have 1, 2, 4, 8, 16, or 32 bits of data for every pixel. Such bit field data can contain user definable information, e.g., colorant value, transparency or the like. Internally, all bit fields are packed into pixel-chunk structures, as set forth above, plane-by-plane, in chunks of 64 values. Thus, minimal bit fields plane memory allocations use 8 bytes (1 bit sized data values) up to 256 bytes (32 bit sized data values). The page buffer manager requires the user to input the page size, e.g., length and width, as well as cache characteristics and bit fields specifications.

While in the preferred embodiment the present invention is implemented in software, as those skilled in the art can readily appreciate it may also be implemented in hardware or a combination of software and hardware.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A raster image processor comprising:
   means adapted for receiving image data, which image data is comprised of a linear bit stream representative of an associated image;
   segmenting means adapted for segmenting the image data into a plurality of chunks including M existing chunks and a remaining plurality of non-existing chunks, wherein each of the M existing chunks includes data corresponding to at least one pixel that has been used in connection with a prior rendering operation, wherein each of the plurality of existing chunks is comprised of N bits, and wherein M and N are integers greater than one;
   page map memory adapted for storing page map data, which page map data includes at least M entries, each entry corresponding to a single chunk from the plurality of existing chunks and non-existing chunks, each entry adapted for storing a first flag value representative of a first selected value of a chunk from the plurality of existing chunks and non-existing chunks corresponding thereto and at least a second flag value when the chunk corresponding thereto is other than the first selected value;
   means adapted for grouping the M existing chunks into a plurality of subsets thereof; and
   scan list memory adapted for storing scan list data, which scan list data is comprised of an indexed array wherein each element thereof functions as a pointer to an initial existing chunk in a subset thereof, and the initial existing chunk includes a pointer to a subsequent existing chunk in the subset.

2. The raster image processor of claim 1 further comprising:
   memory allocation means, which memory allocation means is adapted to allocate at least N bits of data storage in an associated page memory for each entry in the page map memory having the first flag value, and wherein the memory allocation means is adapted to allocate no data storage bits for each entry in the page map memory being other than the first selected value.

3. The raster image processor of claim 2 further comprising:
   addressing means adapted for addressing the page memory, which addressing means includes means adapted for receiving address information solely to an entry corresponding to a first chunk (M=1) associated therewith, wherein each successive entry associated with the first chunk includes pointer data representative of an entry corresponding to with a next chunk (M=2, 3, . . . ), such that the entries form a linked list.

4. The raster image processor of claim 3 further comprising means adapted for receiving, into the associated page memory, each chunk of the plurality of existing chunks and non-existing chunks of the image data corresponding to the first flag value.

5. The raster image processor of claim 4 further comprising means adapted for selectively initiating communication of the image data from the associated page memory to a selected document output device.

6. The raster image processor of claim 4 wherein the document output device includes a facsimile, a printing device, a scanning device, a copying device, and a multifunctional peripheral device.

7. The raster image processor of claim 4 further comprising compression means adapted for selectively compressing at least one chunk of the plurality of existing chunks and non-existing chunks of image data based on predetermined criteria.

8. The raster image processor of claim 7 further comprising decompression means adapted for selectively decompressing the at least one chunk of the plurality of existing chunks and non-existing chunks of image data.

9. A raster image processing method comprising the steps of:
   receiving image data into a processor having a memory associated therewith, which image data is comprised of a linear bit stream representative of an associated image;
   segmenting the image data into a plurality of chunks including M existing chunks and a remaining plurality of non-existing chunks, wherein each of the M existing chunks includes data corresponding to at least one pixel that has been used in connection with a prior rendering operation, wherein each of the plurality of existing chunks in comprised of N bits, and wherein M and N are integers greater than one;
   storing page map data, which page map data includes at least M entries, each entry corresponding to a single chunk from the plurality of existing chunks and non-existing chunks, each entry adapted for storing a first flag value representative of a first selected value of a chunk from the plurality of existing chunks and non-existing chunks corresponding thereto and at least a second flag value when the chunk corresponding thereto is other than the first selected value;
   grouping the M existing chunks into a plurality of subsets thereof; and
   storing scan list data in a memory, which scan list data is comprised of an indexed array wherein each element thereof functions as a pointer to an initial existing chunk in a subset thereof, and the initial existing chunk includes a pointer to a subsequent existing chunk in the subset.

10. The raster image processing method of claim 9 further comprising the step of allocating at least N bits of data storage in an associated page memory for each entry in the page map memory having the first flag value, and wherein no data storage bits are allocated for each entry in the page map memory being other than the first selected value.

11. The raster image processing method of claim 10 further comprising the step of addressing the page memory, which includes receiving address information solely to an entry corresponding to a first chunk (M=1) associated therewith, wherein each successive entry associated with the first chunk includes pointer data representative of an entry corresponding to a next chunk (M=2, 3, . . . ), such that the entries form a linked list.

12. The raster image processing method of claim 11 further comprising the step of receiving, into the associated page memory, each chunk of the plurality of existing chunks and non-existing chunks of the image data corresponding to the first flag value.

13. The raster image processing method of claim 12 further comprising the step of selectively initiating communication of the image data from the associated page memory to a selected document output device.

14. The raster image processing method of claim 13 wherein the document output device includes a facsimile, a printing device, a scanning device, a copying device, and a multifunctional peripheral device.

15. The raster image processing method of claim 13 further comprising the step of selectively compressing at least one chunk of the plurality of existing chunks and non-existing chunks of image data based on predetermined criteria.

16. The raster image processing method of claim 15 further comprising the step of selectively decompressing the at least one chunk of the plurality of existing chunks and non-existing chunks of image data.

17. A computer-readable medium encoded with computer executable instructions stored in a memory and operable on an processor associated therewith for raster image processing comprising:
instructions for receiving image data, which image data is comprised of a linear bit stream representative of an associated image;
instructions for segmenting the image data into a plurality of chunks including M existing chunks and a remaining plurality of non-existing chunks, wherein each of the M existing chunks includes data corresponding to at least one pixel that has been used in connection with a prior rendering operation, wherein each of the plurality of existing chunks is comprised of N bits, and wherein M and N are integers greater than one;
instructions for storing page map data, which page map data includes at least M entries, each entry corresponding to a single chunk from the plurality of existing chunks and non-existing chunks, each entry adapted for storing a first flag value representative of a first selected value of a chunk from the plurality of existing chunks and non-existing chunks corresponding thereto and at least a second flag value when the chunk corresponding thereto is other than the first selected value;
instructions for grouping the M existing chunks into a plurality of subsets thereof; and
instructions for storing scan list data in a memory, which scan list data is comprised of an indexed array wherein each element thereof functions as a pointer to an initial existing chunk in a subset thereof, and the initial existing chunk includes a pointer to a subsequent existing chunk in the subset.

18. The computer-readable medium encoded with computer executable instructions for raster image processing of claim 17 further comprising:
instructions for allocating at least N bits of data storage in an associated page memory for each entry in the page map memory having the first flag value, and wherein no data storage bits are allocated for each entry in the page map memory being other than the first selected value.

19. The computer-readable medium encoded with computer executable instructions for raster image processing of claim 18 further comprising:
instructions for addressing the page memory, which includes instructions for receiving address information solely to an entry corresponding to a first chunk (M=1) associated therewith, wherein each successive entry associated with the first chunk includes pointer data representative of an entry corresponding to with a next chunk (M=2, 3, . . . ), such that the entries form a linked list.

20. The computer-readable medium encoded with computer executable instructions for raster image processing of claim 19 further comprising instructions for receiving, into the associated page memory, each chunk of the plurality of existing chunks and non-existing chunks of the image data corresponding to the first flag value.

21. The computer-readable medium encoded with computer executable instructions for raster image processing of claim 20 further comprising instructions for selectively initiating communication of the image data from the associated page memory to a selected document output device.

22. The computer-readable medium encoded with computer executable instructions for raster image processing of claim 20 further comprising instructions for selectively compressing at least one chunk of the plurality of existing chunks and non-existing chunks of image data based on predetermined criteria and instructions for selectively decompressing the at least one chunk of the plurality of existing chunks and non-existing chunks of image data.

23. A computer-implemented method for raster image processing operable as instructions running on a processor, comprising the steps of:
receiving image data, which image data is comprised of a linear bit stream representative of an associated image;
segmenting the image data into a plurality of chunks including M existing chunks and a remaining plurality of non-existing chunks, wherein each of the M existing chunks includes data corresponding to at least one pixel that has been used in connection with a prior rendering operation, wherein each of the plurality of existing chunks is comprised of N bits, wherein M and N are integers greater than one;
storing page map data, which page map data includes at least M entries, each entry corresponding to a single chunk from the plurality of existing chunks and non-existing chunks, each entry adapted for storing a first flag value representative of a first selected value of a chunk from the plurality of existing chunks and non-existing chunks corresponding thereto and at least a second flag value when the chunk corresponding thereto is other than the first elected value;
grouping the M existing chunks into a plurality of subsets thereof; and storing scan list data in a memory, which scan list data is comprised of an indexed array wherein each element thereof functions as a pointer to an initial existing chunk in a subset thereof, and the initial existing chunk includes a pointer to a subsequent existing chunk in the subset.

24. The computer-implemented method for raster image processing of claim 23 further comprising the step of allocating at least N bits of data storage in an associated page memory for each entry in the page map memory having the first flag value, and wherein no data storage bits are allocated for each entry in the page map memory being other than the first selected value.

25. The computer-implemented method for raster image processing of claim 24 further comprising the step of addressing the page memory, which includes receiving address information solely to an entry corresponding to a first chunk (M=1) associated therewith, wherein each successive entry associated with the first chunk includes pointer data representative of an entry corresponding to with a next chunk (M=2, 3, . . . ), such that the entries form a linked list.

26. The computer-implemented method for raster image processing of claim 25 further comprising the step of receiving, into the associated page memory, each chunk from the plurality of existing chunks and non-existing chunks of the image data corresponding to the first flag value.

27. The computer-implemented method for raster image processing of claim 26 further comprising the step of selectively initiating communication of the image data from the associated page memory to a selected document output device.

28. The computer-implemented method for raster image processing method of claim 26 further comprising the steps of selectively compressing at least one chunk of the plurality of existing chunks and non-existing chunks of image data based on predetermined criteria and selectively decompressing the at least one chunk of the plurality of existing chunks and non-existing chunks of image data.

* * * * *